United States Patent
Onohara et al.

(10) Patent No.: US 11,088,776 B2
(45) Date of Patent: Aug. 10, 2021

(54) OPTICAL TRANSMISSION/RECEPTION DEVICE AND OPTICAL TRANSMISSION/RECEPTION METHOD

(71) Applicant: MITSUBISHI ELECTRIC CORPORATION, Tokyo (JP)

(72) Inventors: Kiyoshi Onohara, Tokyo (JP); Keisuke Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/635,709

(22) PCT Filed: Aug. 31, 2017

(86) PCT No.: PCT/JP2017/031303
§ 371 (c)(1),
(2) Date: Jan. 31, 2020

(87) PCT Pub. No.: WO2019/043856
PCT Pub. Date: Mar. 7, 2019

(65) Prior Publication Data
US 2021/0135776 A1    May 6, 2021

(51) Int. Cl.
*H04J 14/06* (2006.01)
*H04B 10/40* (2013.01)
*H04B 10/61* (2013.01)

(52) U.S. Cl.
CPC .............. *H04J 14/06* (2013.01); *H04B 10/40* (2013.01); *H04B 10/6165* (2013.01)

(58) Field of Classification Search
CPC .. H04B 10/40; H04B 10/6165; H04B 10/079; H04J 14/06
See application file for complete search history.

(56) References Cited

U.S. PATENT DOCUMENTS

2013/0251369 A1    9/2013    Ogasahara
2014/0363176 A1    12/2014    Mizuguchi
(Continued)

FOREIGN PATENT DOCUMENTS

EP    3142269 A1    3/2017
JP    2001-91643 A    4/2001
(Continued)

OTHER PUBLICATIONS

International Search Report, issued in PCT/JP2017/031303, PCT/ISA/210, dated Nov. 28, 2017.
(Continued)

*Primary Examiner* — Dzung D Tran
(74) *Attorney, Agent, or Firm* — Birch, Stewart, Kolasch & Birch, LLP.

(57) ABSTRACT

Provided is an optical transmission/reception device (1) for transmitting or receiving an optical signal via a communication path (2) in which a phase change of the optical signal is suppressed. The optical transmission/reception device (1) includes: a transmission device (10) including a framer generation unit (11), a symbol mapping unit (12), and an optical modulation unit (13); and a reception device (20) including an optical reception front end unit (21), an A/D conversion unit (22), a polarization separation unit (23), and a phase estimating unit (24) for estimating a phase of at least one of a plurality of polarizations from a plurality of polarization signals separated by the polarization separation unit (23) and estimating a phase of a remaining polarization on the basis of the estimated phase. The optical transmission/reception device (1), therefore, has a small circuit scale and allows a digital coherent reception system to be applied to free space optics or a communication system with a short communication distance such as an access network.

4 Claims, 3 Drawing Sheets

(56) References Cited

U.S. PATENT DOCUMENTS

| | | | |
|---|---|---|---|
| 2015/0280856 A1* | 10/2015 | Nakashima | H04B 10/6162 |
| | | | 398/65 |
| 2015/0333838 A1 | 11/2015 | Horikoshi et al. | |
| 2016/0241341 A1* | 8/2016 | Endo | H04B 10/612 |
| 2017/0041067 A1* | 2/2017 | Goto | H04B 10/07953 |
| 2020/0076508 A1* | 3/2020 | Jia | H04B 10/61 |

FOREIGN PATENT DOCUMENTS

| | | |
|---|---|---|
| JP | 2014-241483 A | 12/2014 |
| WO | WO 2014/115840 A1 | 7/2014 |
| WO | WO 2014/196179 A1 | 12/2014 |
| WO | WO 2015/170558 A1 | 11/2015 |

OTHER PUBLICATIONS

International Telecommunication Union, "Interfaces for the optical transport network", ITU-T G.709/Y.1331, Feb. 2012, total 238 pages.

Extended European Search Report, dated Aug. 3, 2020, for European Application No. 17922959.6.

* cited by examiner

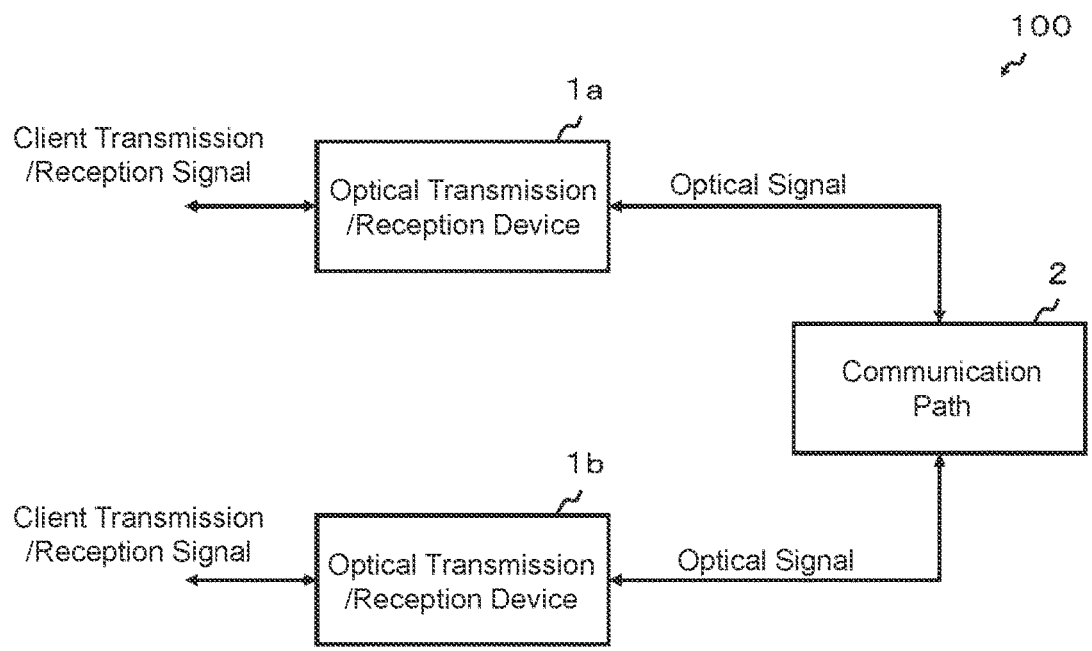
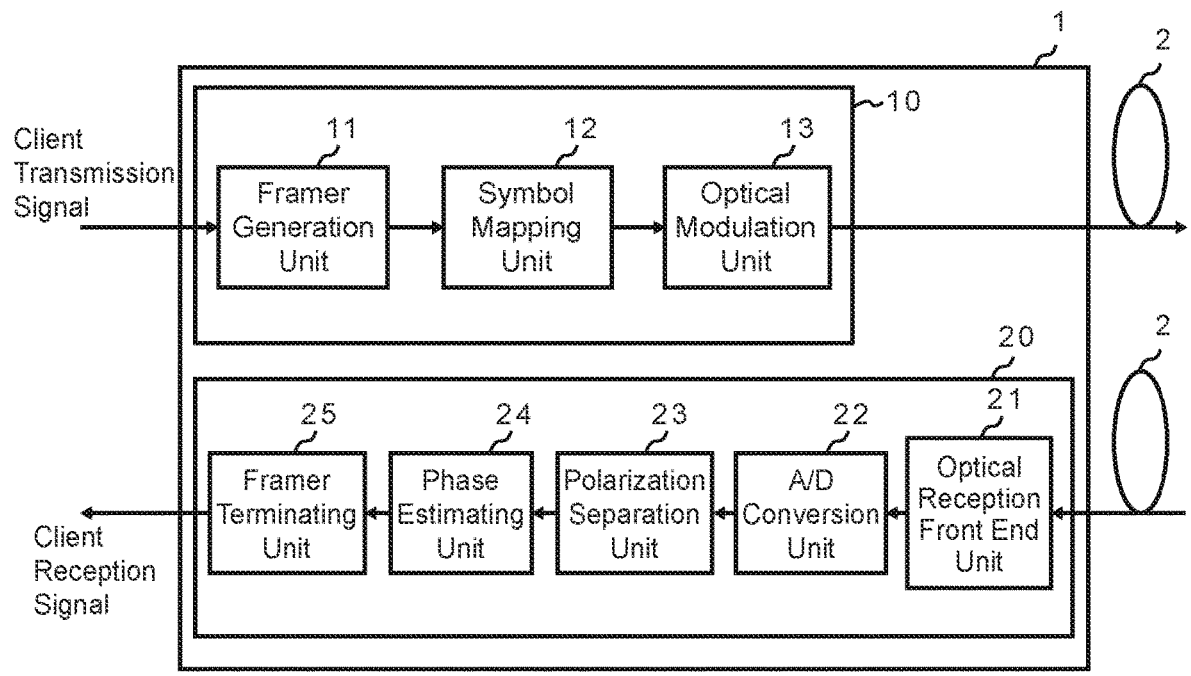

OPTICAL TRANSMISSION/RECEPTION DEVICE AND OPTICAL TRANSMISSION/RECEPTION METHOD

TECHNICAL FIELD

The present invention relates to an optical transmission/reception device and an optical transmission/reception method for receiving an optical signal obtained by multi-level modulation of an information signal and demodulating the reception signal by performing digital signal processing.

BACKGROUND ART

Conventional optical transmission/reception devices and optical transmission/reception methods use, for example, on-off keying (OOK) or binary phase shift keying (BPSK) as an optical modulation system of an optical transmission signal to be transmitted. However, in recent years, there has been a demand for an increase in the capacity of optical communication systems due to an increase in traffic on the Internet, and thus studies are made on systems for handling multi-level phase-modulated signals using digital signal processing technology capable of transmitting and receiving a larger amount of information than conventional optical modulation systems can. Such modulation systems for multi-level phase-modulated signals include quadrature phase shift keying (QPSK), differential quadrature phase shift keying (DQPSK), eight quadrature amplitude modulation (8QAM).

In accordance with the optical modulation system of optical signals to be transmitted, optical signal reception systems are also advancing from the conventional direct detection systems, in which on/off of the light intensity is assigned to binary signals and the binary signals are directly detected, to studies on a digital coherent reception system, in which light intensity information and phase information of an optical signal are extracted by causing a continuous wave local oscillation light from a local oscillation light source to interfere with the optical signal that is optically modulated. The light intensity and the phase information of the optical signal extracted by the digital coherent reception system are quantized by an analog/digital converter after the extraction and demodulated by a digital signal processing unit.

One advantage of the digital coherent reception system is that a mechanism for synchronizing the frequencies and the phases of the transmission light source and the local oscillation light source with an optical reception signal can be implemented as digital signal processing. As a result, the frequencies and the phases of the transmission light source and the local oscillation light source can be synchronized with the optical reception signal without implementing an optical phase locked loop (PLL) that is difficult to be implemented. As a specific implementation method, Patent Literature 1 proposes an approach using the m-th power method (Viterbi-Viterbi algorithm). It is also possible to multiplex an optical signal to be transmitted by superimposing a signal on polarized light, and a reception device can separate the multiplexed polarization signals using a polarization separation algorithm such as constant modulus algorithm (CMA).

The digital coherent reception system is also tolerant in terms of the optical signal-to-noise ratio (OSNR) and against waveform distortion in a communication path.

CITATION LIST

Patent Literatures

Patent Literature 1: WO 2014/115840

SUMMARY OF INVENTION

Technical Problem

In recent years, studies have been made on the use of a digital coherent system for free space optics that performs optical communication using a space as a medium, or for a communication system such as an access network having a short communication distance of about 40 km. However, there is a problem that the conventional digital coherent reception system is suited for metro networks or backbone networks with a communication distance of 600 km to 10,000 km, and thus is difficult to be applied to free space optics or a communication system with a short communication distance such as an access network since optical transmission/reception devices have a large power consumption and have a large circuit scale.

Also in a digital coherent reception system in an optical reception device of Patent Literature 1, there is a problem that, in a case where the optical modulation system handles multi-level phase-modulated signals such as QPSK, a phase compensation block for X-polarization and a phase compensation block for Y-polarization are necessary, resulting in a large circuit scale.

The present invention has been made to solve the above-described problems, and it is an object of the present invention to implement an optical transmission/reception device having a small circuit scale and capable of applying a digital coherent reception system to free space optics or a communication system with a short communication distance such as an access network.

Solution to Problem

In order to solve the above-described problems and to achieve the object, an optical transmission/reception device of the present invention performs transmission or reception via a communication path in which a phase change of an optical signal is negligible, the optical transmission/reception device including: a transmission device including: a framer generator to map an information signal to a data frame for optical transmission; a symbol mapper to multi-level modulate the information signal of the data frame; and an optical modulator to convert the data frame multi-level modulated by the symbol mapper into an optical polarization multiplexed signal by superimposing the data frame on a plurality of polarizations of an optical carrier wave, and transmit the optical polarization multiplexed signal to the communication path; and a reception device including: an optical reception front end to receive an optical polarization multiplexed signal from a communication opponent via the communication path and convert an optical signal that is obtained by causing interference between the received optical polarization multiplexed signal and a continuous wave local oscillation light oscillated by a local oscillator, into analog electric signals; an A/D converter to convert the analog signals into digital signals; a polarization separator to separate the received optical polarization multiplexed signal into a plurality of polarization signals using the digital signals; a phase estimator to estimate a first phase of a first polarization being a phase of at least one of a plurality of polarizations from the plurality of polarization signals separated by the polarization separator, and estimate the first phase or a phase obtained by correcting the first phase, as a second phase of a second polarization being different from the first polarization; and a framer terminator to demap an information signal from a data frame including the first and second phases estimated by the phase estimator.

Advantageous Effects of Invention

According to an optical transmission/reception device of the present invention including the above-described configuration, the circuit scale can be small, and it is possible to apply a digital coherent reception system to free space optics or a communication system with a short communication distance such as an access network.

BRIEF DESCRIPTION OF DRAWINGS

FIG. 1 is a configuration diagram illustrating an example of a digital communication system in a first embodiment of the present invention.

FIG. 2 is a configuration diagram illustrating an example of an optical transmission/reception device in the first embodiment of the present invention.

DESCRIPTION OF EMBODIMENTS

Figure 3:
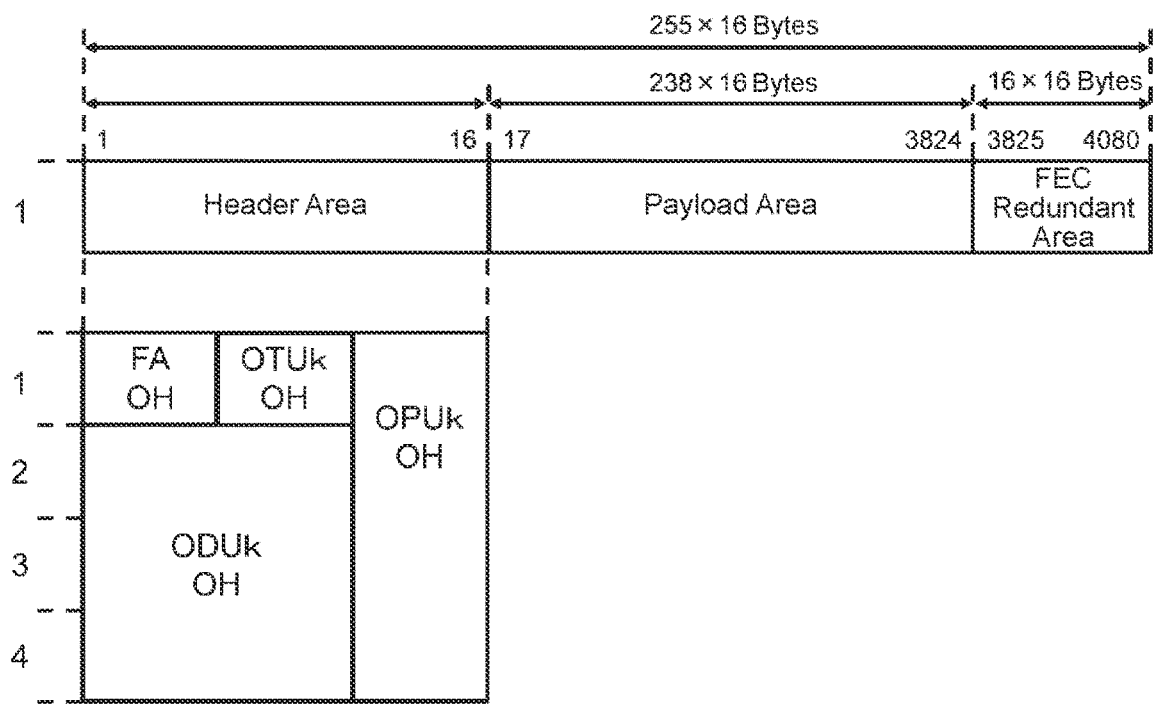
FIG. 3 is a configuration diagram illustrating an example of an OTUk frame in the first embodiment of the present invention.

Embodiments of an optical transmission/reception device according to the present invention will be described below in detail with reference to the drawings. Note that in the drawings referred to in the description below, the same or corresponding parts are denoted by the same symbols. Note that the present invention is not limited by these embodiments.

First Embodiment

FIG. 1 is a configuration diagram illustrating an example of a digital communication system in a first embodiment of the present invention. In the following description, the digital communication system as illustrated in FIG. 1 is simply referred to as "optical communication system." In the following description, unless otherwise specified, an optical communication system refers to free space optics or a communication system having a short communication distance such as an access network.

As illustrated in FIG. 1, an optical communication system 100 includes two optical transmission/reception devices 1 (1a and 1b) and a communication path 2. The optical transmission/reception devices 1 have at least a transmission function or a reception function of optical signals, and the communication path 2 is a wired transmission path such as an optical fiber, or a wireless transmission path including electromagnetic waves such as microwaves, infrared rays, or visible rays that are transmitted in the air or in a vacuum. Here, in the case of free space optics, the communication path 2 includes a wireless transmission path, and in the case of an access network, the communication path 2 includes a wired transmission path or a wireless transmission path having a short communication distance. The optical transmission/reception devices 1a and 1b perform two-way communication of optical signals via the communication path 2. Note that details of the optical transmission/reception devices 1 will be described later.

FIG. 2 is a configuration diagram illustrating an exemplary optical transmission/reception device in the first embodiment of the present invention. As illustrated in FIG. 2, an optical transmission/reception device 1 includes a transmission device 10 and a reception device 20.

The transmission device 10 includes a framer generation unit 11, a symbol mapping unit 12, and an optical modulation unit 13.

The framer generation unit 11 maps a client transmission signal which is an information signal, to a data frame for optical signal, adds information necessary for frame synchronization and maintenance monitoring, and thereby generates a signal as an optical transmission frame. In the following, a case where the data frame for optical signal is an optical channel transport unit-k (OTUk) (k=0, 1, 2, 3, 4 . . . ) frame will be described as an example. Here, an OTUk frame is a data frame described in a reference document (ITU-T Recommendation G.709). Note that the data frame for optical signal is not limited to the OTUk frame, and is only required to be a general data frame for optical signal such as an optical channel payload unit (OPU) frame or an optical transport network (OTN) frame.

FIG. 3 is a configuration diagram illustrating an example of an OTUk frame in the first embodiment of the present invention. As illustrated in FIG. 3, an OTUk frame has a frame size of 16320 bytes consisting of 4 rows×4080 columns, in which the first to sixteenth columns are a header area, the seventeenth to 3824th columns are a payload area used to store the actual information data such as a client transmission signal that is an information signal, and the 3825th to 4080th columns are a forward error correction (FEC) redundant area used for error correction. The header area includes a frame alignment overhead (FA OH) for frame synchronization, an OTUk OH and an optical channel data unit-k overhead (ODUk OH) for maintenance monitoring information, and an optical channel payload unit-k (OPUk OH) for payload mapping.

Referring back to FIG. 2, the symbol mapping unit 12 modulates the signal generated by the framer generation unit 11, by using a phase modulation system, for example, QPSK, DQPSK, and 8QAM, to generate a multi-level phase-modulated signal.

The optical modulation unit 13 converts the multi-level phase-modulated signal generated by the symbol mapping unit 12 into an optical polarization multiplexed signal, by superimposing the multi-level phase-modulated signal on a plurality of polarizations of an optical carrier wave, and thereby generates an optical transmission signal and transmits the optical transmission signal to the communication path 2. Thereafter, the optical transmission signal transmitted from the optical modulation unit 13 is transmitted to the optical transmission/reception device 1 as the destination via the communication path 2.

Referring back to FIG. 2, the reception device 20 includes an optical reception front end unit 21, an analog/digital (A/D) conversion unit 22, a polarization separation unit 23, a phase estimating unit 24, and a framer terminating unit 25.

Figure 4:
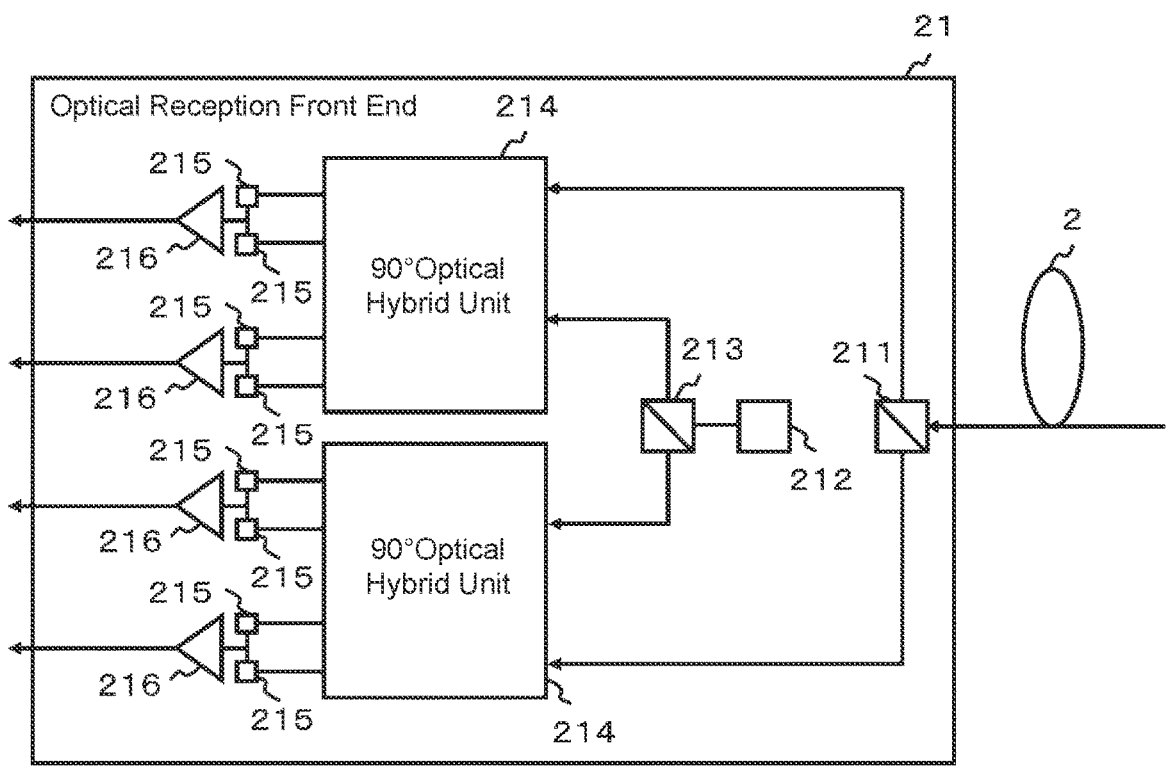
FIG. 4 is a configuration diagram illustrating an example of an optical reception front end unit in the first embodiment of the present invention.

The optical reception front end unit 21 converts an optical reception signal received from the optical transmission/reception device 1 as a source via the communication path 2, into analog electric signals. FIG. 4 is a configuration diagram illustrating an example of an optical reception front end unit in the first embodiment of the present invention.

As illustrated in FIG. 4, the optical reception front end unit 21 includes a polarization beam splitter (PBS) 211 for separating the X-polarization and the Y-polarization of the optical reception signal received from the communication path 2, a local oscillator (LO) 212 which includes a local oscillation light source and causes continuous wave local oscillation light to oscillate that is a sine wave having a different frequency from that of the optical reception signal received by the optical reception front end unit 21, a PBS 213 for separating polarizations of the continuous wave local oscillation light oscillated from the LO 212, 90° optical hybrid units 214 for causing interference between the optical reception signal polarizations of which have been separated by PBS 211, and the continuous wave local oscillation light which is caused to oscillate by the LO 212 and polarizations of which have been separated by the PBS 213, optical/electrical (O/E) converters 215 for converting optical signals received from the 90° optical hybrid units 214 into analog electric signals, and amplifiers (AMP) 216 for amplifying the analog electric signals converted by the O/E converters 215.

Referring back to FIG. 2, the A/D conversion unit 22 receives the analog electric signals from the optical reception front end unit 21, and converts the received analog signals into n-bit digital electric signals.

The polarization separation unit 23 receives the digital electric signals from the A/D conversion unit 22, and performs digital signal processing on the received digital electric signals to separate two or more polarizations orthogonal to each other in the communication path 2, for example, X-polarization and Y-polarization.

Figure 5:
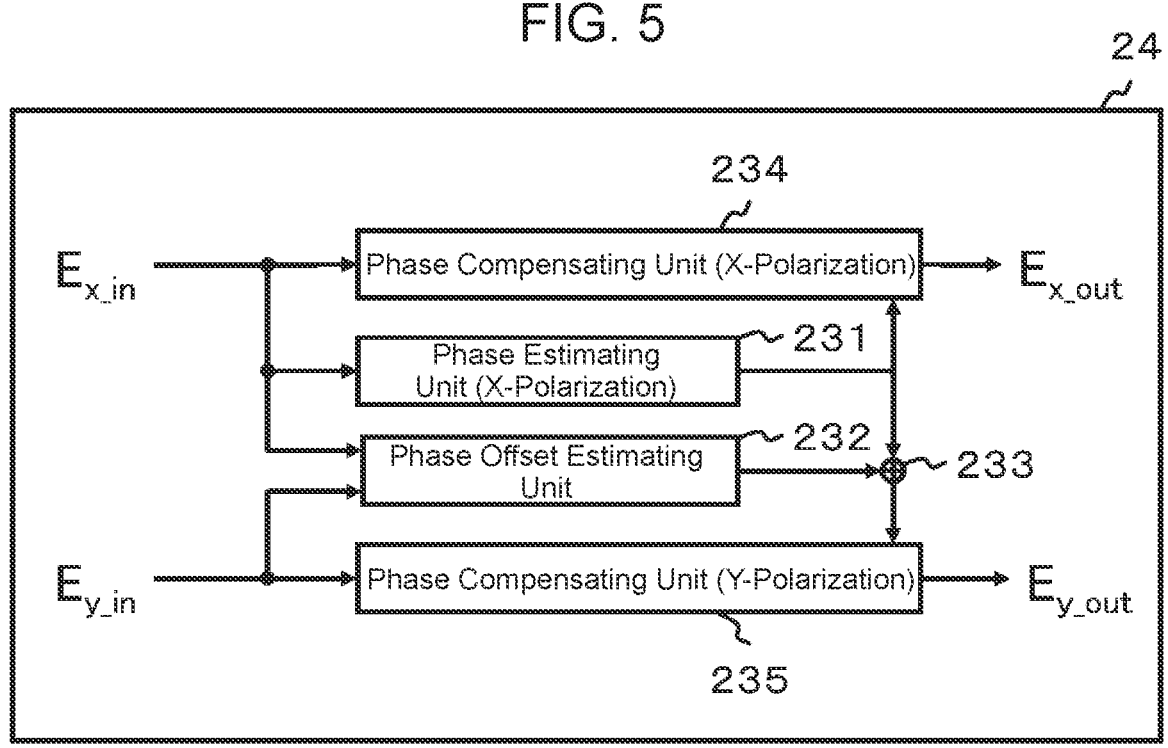
FIG. 5 is a configuration diagram illustrating an example of a phase estimating unit in the first embodiment of the present invention.

The phase estimating unit 24 estimates the phases of the polarizations separated by the polarization separation unit 23. FIG. 5 is a configuration diagram illustrating an example of the phase estimating unit in the first embodiment of the present invention.

As illustrated in FIG. 5, the phase estimating unit 24 includes a phase estimating unit (X-polarization) 231, a phase offset estimating unit 232, a phase adding unit 233, a phase compensating unit (X-polarization) 234, and a phase compensating unit (Y-polarization) 235. The phase estimating unit 24 receives Ex_in and Ey_in, which are respective signals of the X-polarization and the Y-polarization received from the polarization separation unit 23. The received Ex_in is input to the phase estimating unit 231, the phase offset estimating unit 232, and the phase compensating unit (X-polarization) 234. The received Ey_in is input to the phase offset estimating unit 232 and the phase compensating unit (Y-polarization) 235.

The phase estimating unit (X-polarization) 231 estimates the phase of the X-polarization of the digital electric signal that is the received reception signal, for example, using the m-th power method (Viterbi-Viterbi algorithm). In this example, the m-th power method refers to a phase estimation method that performs phase estimation using the phenomenon that phases overlap at one point on a complex plane when a reception signal of an m-value PSK signal is raised to the m-th power as described in Patent Literature 1. Hereinafter, as an example, a phase estimation method where m=4, that is, a case where a reception signal is a QPSK signal modulated by the QPSK system will be explained.

Possible values of the phase $\theta_{signal}$ of the reception signal received by the phase estimating unit (X-polarization) 231 are four values of 0, $\pi/2$, $\pi$, and $3\pi/2$ since the reception signal is a QPSK signal. Here, assuming that the total amount of phase fluctuation of the reception signal is $\theta_{noise}$, the power I of the reception signal is expressed by the relationship of Formula 1.

[Formula 1]

$$I \propto \exp\{-j(\theta_{signal}+\theta_{noise})\} \quad \text{Formula 1}$$

Raising Formula 1 to the fourth power gives the power I of the reception signal expressed by Formula 2.

[Formula 2]

$$I \propto \exp\{-j(4 \times \theta_{noise})\} \quad \text{Formula 2}$$

From Formula 2, the phase estimating unit (X-polarization) 231 can calculate a value obtained by multiplying $\theta_{noise}$ by 4, and multiplying this value by ¼ gives the value of $\theta_{noise}$. The phase estimating unit (X-polarization) 231 removes $\theta_{noise}$ from the reception signal using the obtained $\theta_{noise}$ and estimates the phase using Formula 3.

[Formula 3]

$$I \propto \exp\{-j(\theta_{signal}+\theta_{noise}-\theta_{noise})\}=\exp(-j\theta_{signal}) \quad \text{Formula 3}$$

Next, a processing flow for estimating the phase of the X-polarization of the digital electric signal that is the reception signal received by the phase estimating unit (X-polarization) 231 will be explained with reference to FIG. 6. FIG. 6 are explanatory diagrams illustrating an example of a processing flow of the phase estimation method based on the m-th power method in the first embodiment of the present invention. Hereinafter, as an example, the processing flow of the phase estimation method where m=4, that is, a case where a reception signal is a QPSK signal modulated by the QPSK system will be explained.

Figure 6A:
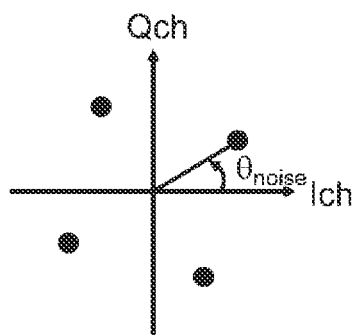
FIGS. 6A-C are explanatory diagrams illustrating an example of a processing flow of a phase estimation method based on an m-th power method of the first embodiment of the present invention.
Figure 6B:
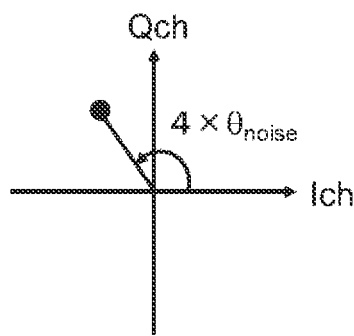
Figure 6C:
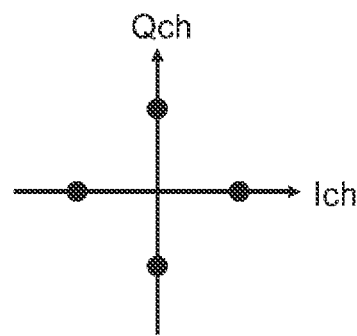

FIG. 6A is an explanatory diagram illustrating Formula 1 representing the phase of a reception signal including $\theta_{noise}$, FIG. 6B is an explanatory diagram illustrating Formula 2 in which the reception signal is raised to the fourth power to include only $\theta_{noise}$, and FIG. 6C is an explanatory diagram illustrating Formula 3 in which $\theta_{noise}$ is removed from the reception signal. The horizontal axis in each of the drawings represents an in-phase axis (Ich), and the vertical axis represents an orthogonal axis (Qch). Black dots represent possible phases.

As illustrated in FIG. 6A, the reception signal has four possible phases including $\theta_{noise}$. Here, since raising the reception signal to the fourth power gives Formula 2, the phase obtained by raising the reception signal to the fourth power is $4 \times \theta_{noise}$ as illustrated in FIG. 6B. Moreover, since removing $\theta_{noise}$ from the reception signal gives Formula 3, the phase obtained by removing $\theta_{noise}$ from the reception signal has four possible phases on the in-phase axis or the orthogonal axis as illustrated in FIG. 6C.

As illustrated in FIG. 6, the phase estimating unit (X-polarization) 231 estimates phase of the X-polarization of the digital electric signal that is the reception signal using Formulas 1, 2, and 3.

Referring back to FIG. 5, the phase offset estimating unit 232 estimates a phase offset $\theta_{offset}$ indicating the phase shift between the X-polarization and the Y-polarization of the digital electric signal that is the reception signal from Formula 4.

[Formula 4]

$$\theta_{offset} = \arg(E_X^4(E_Y^4)^*)/4 \qquad \text{Formula 4}$$

Here, $\theta_{offset}$ is caused by a difference in digital signal processing time between an X-polarization circuit and a Y-polarization circuit of the optical transmission/reception device 1 and is a value that does not change with time. Therefore, the phase offset estimating unit 232 does not need to calculate $\theta_{offset}$ for every reception signal every time, and is only required to calculate $\theta_{offset}$ at regular intervals or for every certain number of symbols in consideration of the influence of signal quality degradation of the reception signal. For example, the phase offset estimating unit 232 calculates once for every 500 symbols, that is, $\theta_{offset}$ for reception signals that are about 0.2% of the number of symbols, so that it is possible to substantially ignore the influence of signal quality degradation of reception signals.

The phase adding unit 233 adds the $\theta_{offset}$ estimated by the phase offset estimating unit 232 to the phase of the X-polarization of the digital electric signal that is the reception signal, the phase being estimated by the phase estimating unit (X-polarization) 231, thereby estimating the phase of the Y-polarization of the digital electric signal that is the reception signal.

The phase compensating unit (X-polarization) 234 generates a digital electric signal Ex_out obtained by compensating the digital electric signal Ex_in that is the reception signal on the basis of the phase of the X-polarization of the digital electric signal that is the reception signal, the phase being estimated by the phase estimating unit (X-polarization) 231, and outputs the digital electric signal Ex_out.

The phase compensating unit (Y-polarization) 235 generates a digital electric signal Ey_out obtained by compensating the digital electric signal Ey_in that is the reception signal on the basis of the phase of the Y-polarization of the digital electric signal that is the reception signal, the phase being estimated by the phase adding unit 233, and outputs the digital electric signal Ey_out.

As described above, the phase estimating unit 24 uses the estimated phase with respect to the X-polarization of the digital electric signal that is the reception signal, so that can estimate the phase of the other polarization, that is, Y-polarization of the digital electric signal that is the reception signal.

The reason why the optical communication system in the first embodiment can estimate, by using the estimation result of the phase of one polarization of the optical reception signal, the phase of the other polarization, will be described below.

There are following two factors that cause changes in the frequencies and the phases of the optical transmission signal transmitted from the transmission-side optical transmission/reception device 1 and the continuous wave local oscillation light oscillated from the LO 212 of the reception-side optical transmission/reception device 1. One factor is the phase fluctuation in each of the transmission light source for the optical transmission signal and the local oscillation light source of the LO 212. The other factor is a nonlinear effect of an optical fiber used as the communication path 2. This is because the refractive index of the optical fiber changes depending on the intensity of light, and this causes the phase of the polarization-multiplexed optical signal transmitted through the optical fiber to change for each polarization.

Since the communication distance is long in a metro network or a backbone network, the amount of phase change that each of the X-polarization and the Y-polarization of the polarization-multiplexed optical signal undergoes during transmission on the communication path 2 is different between the polarizations. Therefore, it is necessary to estimate the phase of each of the X-polarization and the Y-polarization of the optical reception signal on the reception-side optical transmission/reception device 1.

On the other hand, in free space optics or an access network as the optical communication system of the first embodiment, an optical signal is transmitted in the air or in a vacuum in the former, and thus the refractive index is constant regardless of the intensity of light, thereby generating no nonlinear effect, and in the latter, because of a short communication distance, the amount of phase change that the optical signal undergoes during transmission through the communication path 2 is small even when an optical fiber is used as the communication path 2, thereby the phase change can be substantially negligible. That is, in the free space optics or the access network, the phase change of an optical signal is suppressed in the communication path 2. Therefore, the dominant factor for the phase change in the free space optics or the access network is only the phase fluctuation in each of the transmission light source for the optical transmission signal and the local oscillation light source of the LO 212. Since the optical polarization multiplexed signal is generated from one transmission light source, the phase fluctuation of the transmission light source does not change depending on the type of polarization of the optical signal. Meanwhile, the LO 212 also has only one local oscillation light source, and thus the phase fluctuation of the local oscillation light source of the LO 212 does not change depending on the type of polarization of the optical signal.

Therefore, in the free space optics or the access network as the optical communication system of the first embodiment, in a case where, in the reception-side optical transmission/reception device 1, there is an estimation result obtained by performing phase estimation for at least one polarization with respect to the phase fluctuation in the transmission light source for the optical transmission signal and the local oscillation light source of the LO 212, even without directly performing phase estimation for the other polarization, phase estimation can be indirectly performed for the other polarization.

Referring back to FIG. 2, the framer terminating unit 25 terminates information necessary for frame synchronization or maintenance control for OTUk frame of the digital electric signal received from the phase estimating unit 24, demaps a client reception signal from the OTUk frame, and outputs the client reception signal that is an information signal.

As described above, according to the optical transmission/reception device 1 of the first embodiment, only by including the phase estimating unit that estimates the phase of at least one polarization of a reception signal, it is possible to estimate the phase of the other polarization, and thus it is possible to obtain effects of capable of reducing the circuit scale, thereby enabling application of the digital coherent reception system to free space optics or a communication system with a short communication distance such as an access network.

Note that although the case where the phase estimating unit 24 includes the phase offset estimating unit 232 and the phase adding unit 233 has been described, in a case where the difference in digital signal processing time between the X-polarization circuit and the Y-polarization circuit in the optical transmission/reception device 1 is so small as to be negligible, the phase estimating unit 24 may not include the phase offset estimating unit 232 and the phase adding unit 233. In this case, the phase compensating unit (Y-polarization) 235 generates and outputs Ey_out, using the phase of the X-polarization estimated by the phase estimating unit (X-polarization) 231 as the phase of the Y-polarization.

In a case where the phase estimating unit 24 does not need to include the phase offset estimating unit 232 and the phase adding unit 233, the phase estimating unit 24 can be configured by an even smaller circuit, and thus there can be an effect that the circuit scale of the optical transmission/reception device 1 can be further reduced.

REFERENCE SIGNS LIST

1: optical transmission/reception device, 2: communication path, 10: transmission device, 11: framer generation unit, 12: symbol mapping unit, 13: optical modulation unit, 20: reception device, 21: optical reception front end unit, 211, 213: polarization beam splitter, 212: local oscillator, 214: 90° optical hybrid unit, 215: optical/electrical converter, 216: amplifier, 22: A/D conversion unit, 23: polarization separation unit, 24: phase estimating unit, 231: phase estimating unit (X-polarization), 232: phase offset estimating unit, 233: phase adding unit, 234: phase compensating unit (X-polarization), 235: phase compensating unit (Y-polarization), 25: framer terminating unit, 100: optical communication system

The invention claimed is:

1. An optical transmission/reception device to transmit or receive an optical signal via a communication path in which a phase change of the optical signal is suppressed, the optical transmission/reception device comprising:
   a transmission device comprising: a framer generator to map an information signal to a data frame for optical transmission; a symbol mapper to multi-level modulate the information signal of the data frame; and an optical modulator to convert the data frame multi-level modulated by the symbol mapper into an optical polarization multiplexed signal by superimposing the data frame on a plurality of polarizations of an optical carrier wave, and transmit the optical polarization multiplexed signal to the communication path; and
   a reception device comprising: an optical reception front end to receive an optical polarization multiplexed signal from a communication opponent via the communication path, and convert an optical signal that is obtained by causing interference between the received optical polarization multiplexed signal and a continuous wave local oscillation light oscillated by a local oscillator, into analog electric signals; an A/D converter to convert the analog signals into digital signals; a polarization separator to separate the received optical polarization multiplexed signal into a plurality of polarization signals using the digital signals; a phase estimator to estimate a first phase of a first polarization being a phase of at least one of a plurality of polarizations from the plurality of polarization signals separated by the polarization separator, and estimate the first phase or a phase obtained by correcting the first phase, as a second phase of a second polarization being different from the first polarization; and a framer terminator to demap an information signal from a data frame including the first and second phases estimated by the phase estimator.

2. The optical transmission/reception device according to claim 1, wherein the communication path is a wireless transmission path or a wired transmission path having a short communication distance.

3. The optical transmission/reception device according to claim 1, wherein the phase estimator estimates a phase shift between the first polarization and the second polarization, and estimates the second phase on a basis of the estimated phase shift and the first phase.

4. An optical transmission/reception method comprising:
   mapping an information signal to a data frame when the information signal is transmitted to a communication opponent via a communication path in which a phase change of an optical signal is suppressed, multi-level modulating the data frame, and converting the multi-level modulated data frame into an optical polarization multiplexed signal by superimposing the data frame on a plurality of polarizations of an optical carrier wave and transmitting the optical polarization multiplexed signal to the communication path; and
   mixing an optical polarization multiplexed signal and a signal oscillated by a local oscillator to convert into analog signals when the optical polarization multiplexed signal is received from a communication opponent via the communication path, converting the analog signals into digital signals, separating the received optical polarization multiplexed signal into a plurality of polarization signals using the digital signals, estimating a first phase of a first polarization being a phase of at least one of a plurality of polarizations from the plurality of polarization signals, estimating the first phase or a phase obtained by correcting the first phase, as a second phase of a second polarization being different from the first polarization, and demapping an information signal from a data frame including the first and second phases.

* * * * *